United States Patent
Choi et al.

(10) Patent No.: US 8,554,236 B2
(45) Date of Patent: Oct. 8, 2013

(54) METHOD FOR TRANSMITTING DATA AND TRANSMITTER

(75) Inventors: Hyung-Nam Choi, Hamburg (DE);
Michael Eckert, Braunschweig (DE);
Martin Hans, Bad Salzdetfurth (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1444 days.

(21) Appl. No.: 11/764,316

(22) Filed: Jun. 18, 2007

(65) Prior Publication Data
US 2008/0311922 A1 Dec. 18, 2008

(51) Int. Cl.
*H04W 72/00* (2009.01)
*H04W 4/00* (2009.01)
*H04B 1/00* (2006.01)

(52) U.S. Cl.
USPC .......... 455/450; 370/280; 370/329; 370/337; 375/130

(58) Field of Classification Search
None
See application file for complete search history.

(56) References Cited

U.S. PATENT DOCUMENTS

| | | | | |
|---|---|---|---|---|
| 5,818,825 A | * | 10/1998 | Corrigan et al. | 370/329 |
| 6,567,383 B1 | * | 5/2003 | Bohnke | 370/280 |
| 2003/0096613 A1 | * | 5/2003 | Das et al. | 455/450 |
| 2007/0047483 A1 | * | 3/2007 | Khan | 370/328 |
| 2007/0058595 A1 | * | 3/2007 | Classon et al. | 370/337 |
| 2007/0116094 A1 | * | 5/2007 | Parts et al. | 375/130 |

OTHER PUBLICATIONS

3GPP TS 36.211 V1.1.0 (May 2007); *Technical Specification*; 3rd Generation Partnership Project; Technical Specification Group Radio Access Network; Physical Channels and Modulation (Release 8).
3GPP TS 25.331 V4.5.0 (Jun. 2002); *Technical Specification*; 3rd Generation Partnership Project; Technical Specification Group Radio Access Network; Radio Resource Control (RRC); Protocol Specification (Release 4).

* cited by examiner

*Primary Examiner* — Jinsong Hu
*Assistant Examiner* — William Nealon
(74) *Attorney, Agent, or Firm* — Schiff Hardin LLP

(57) ABSTRACT

A method for transmitting data includes using a plurality of time slots of a physical channel for transmission of the data, the plurality of time slots being grouped into at least a first time slot group and a second time slot group, transmitting data items of the data being associated with a first priority using time slots of the first time slot group, and transmitting data items of the data being associated with a second priority using time slots of the second time slot group.

8 Claims, 6 Drawing Sheets

METHOD FOR TRANSMITTING DATA AND TRANSMITTER

BACKGROUND

Embodiments of the invention relate generally to a method for transmitting data and a transmitter.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
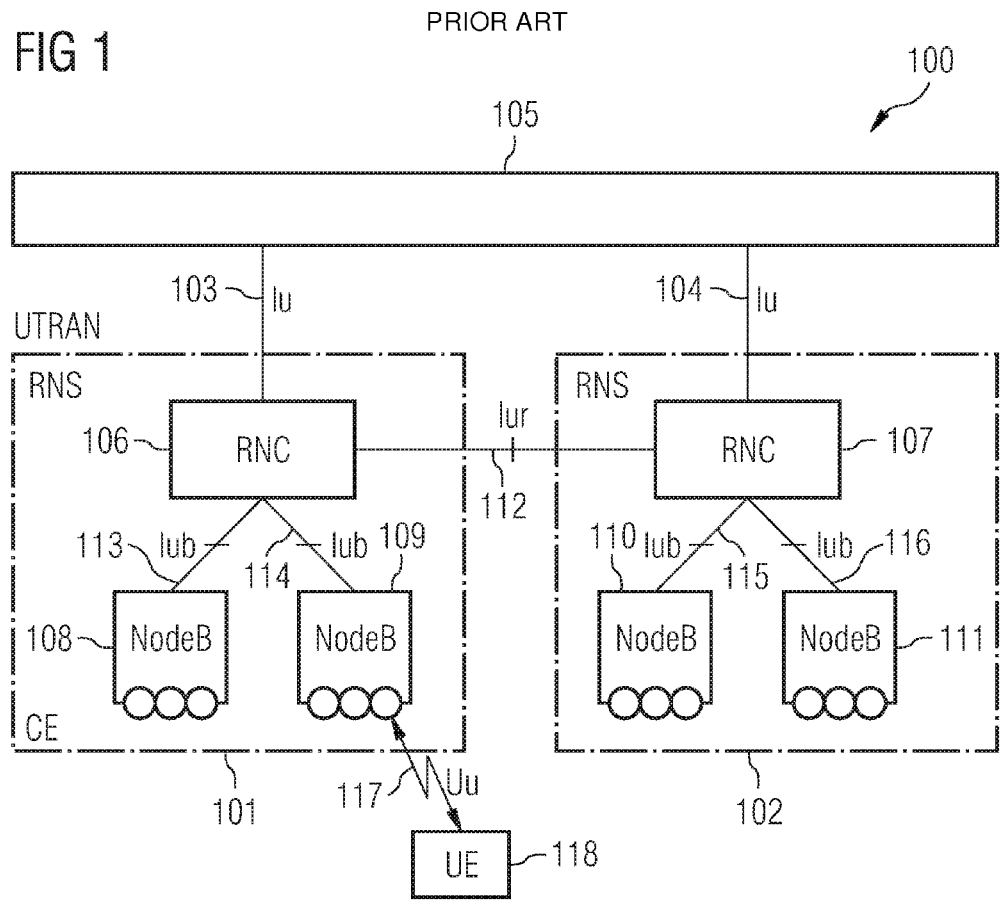
FIG. 1 shows a UMTS mobile radio communication system.

According to one embodiment of the invention, a method for transmitting data is provided including using a plurality of time slots of a physical channel for transmission of the data, the plurality of time slots being grouped into at least a first time slot group and a second time slot group, transmitting data items of the data being associated with a first priority using time slots of the first time slot group, and transmitting data items of the data being associated with a second priority using radio frames of the second time slot group.

According to another embodiment of the invention, a transmitter according to the method for transmitting data is provided.

Illustratively, data to be transmitted may be classified according to two classes and for data of the first data class a first time slot group is used for transmission and for the data of the second data class a second time slot group may be used for transmission. The data items may be associated with the two priorities (or also more than two priorities) based on the types of the data items or based on the size of the data items.

For example, the time slots are arranged in such a way that the data items associated with the first priority are all transmitted without transmitting data items associated with the second priority in between and then the data items associated with the second priority are all transmitted without transmitting data items associated with the first priority in between. This means that the data items associated with the first priority may be sent together and the data items associated with the second priority may be sent together. In this way, a receiver may receive only the data items associated with the first priority or the data items associated with the second priority easily, without the need of repeated checking whether a data item currently transmitted is associated with the first priority or the second priority.

In one embodiment, the data items are sent in a radio cell of a cellular communication network. For example, the data are system information broadcast in the radio cell. The data items may be associated with priorities (i.e. the data may be classified) by the network operator, for example depending on the capabilities of the subscriber terminals.

For example, the data items associated with the first priority correspond to parameters for which parameter values are transmitted in each radio cell of a plurality of radio cells of a cellular communication network. The data items associated with the second priority for example correspond to parameters for which parameter values are not necessarily transmitted in each radio cell of a plurality of radio cells of a cellular communication network.

Illustratively, for example, the transmission of system information in a radio cell is performed according to a structure depending on the configuration of the radio cell (e.g. the maximum number of users the radio cell is designed for).

In one embodiment the data is transmitted using OFDM and the method further includes reserving in the first time slot group and the second time slot group OFDM resources for the transmission of the data.

The data is for example transmitted by the base station in a radio cell of a cellular communication network.

The time slots are for example part of a plurality of multi-frames and for each multi-frame a data item associated with the first priority and comprising a number of the multi-frame is transmitted using time-slots of the multi-frame.

The data item is for example part of a reference system information block and the reference system information block is for example transmitted in each multi-frame of the plurality of multi-frames.

In one embodiment, the plurality of time slots is a plurality of time slots being reserved for the transmission of the data and is part of a plurality of system frames.

According to one embodiment of the invention a method for receiving data is provided comprising determining which time slot group of at least two time slot groups into which a plurality of time slots are grouped is used for transmitting data items of the data being associated with a priority, and receiving the data items associated with the priority during the time slots of the time slot group determined.

In one embodiment, the method for receiving data further comprises determining which other time slot group of the at least two time slot groups into which the plurality of time slots are grouped is used for transmitting data items of the data being associated with another priority, and receiving the data items associated with the other priority during the time slots of the other time slot group.

According to another embodiment, a receiver according to the method for receiving data is provided.

A memory used in the embodiments of the invention may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

A circuit can be a hardware circuit, e.g. an integrated circuit, designed for the respective functionality or also a programmable unit, such as a processor, programmed for the respective functionality.

In the current UMTS mobile radio communication standard (Universal Mobile Telecommunications Systems communications standard), also called Release 7, a maximum net transmission rate of 28.8 Mbps is supported in the downlink transmission direction and of 11.52 Mbps is supported in the uplink transmission direction. The uplink transmission direction, also called the uplink, denotes signal transmission from the mobile radio communication terminal to the respective UMTS base station. The downlink transmission direction also called the downlink, denotes signal transmission from the respective associated UMTS base station to the mobile radio communication terminal. Radio transmission technologies currently specified are Frequency Division Duplex (FDD) and Time Division Duplex (TDD). The multiple access method used is based on Code Division Multiple Access (CDMA) technology.

A current topic on the 3GPP standardization committees (3GPP: $3^{rd}$ Generation Partnership Project) is the further development of UMTS to form a mobile radio communication system optimized for packet data transmission by improving the system capacity and by improving the spectral efficiency. The aim is to increase the maximum net transmission rate significantly in future, namely to 100 Mbps in the downlink transmission direction and to 50 Mbps in the uplink transmission direction. To improve transmission via the air interface, new multiple access methods have been specified, inter alia.

For the downlink transmission direction OFDMA (Orthogonal Frequency Division Multiple Access) in combination with TDMA (Time Division Multiple Access) has been specified. OFDMA in combination with TDMA, subsequently also called OFDMA/TDMA, is a multicarrier multiple access method in which a subscriber is provided with a defined number of subcarriers in the frequency spectrum and a defined transmission time for the purpose of data transmission.

In a cellular mobile radio communication network such as GSM (Global System for Mobile Communications) communication system or the UMTS communication system, important system information from a mobile radio cell is transmitted by a base station using broadcast signals to all subscriber stations situated in the mobile radio cell. Examples of such system information are information specific to network operators, such as the identity of the network and of the mobile radio cell.

Embodiments of the invention may be applied in any cellular communication network such as according to GSM, UMTS, FOMA (Freedom of Mobile Access) or CDMA2000.

FIG. 1 shows a UMTS mobile radio communication system 100, for reasons of simpler illustration particularly the components of the UMTS mobile radio access network (UMTS Terrestrial Radio Access Network, UTRAN), which has a plurality of mobile radio network subsystems (RNS) 101, 102, which are respectively connected to the UMTS core network (CN) 105 by means of what is known as an Iu interface 103, 104. A mobile radio network subsystem 101, 102 respectively has a mobile radio network control unit (Radio Network Controller, RNC) 106, 107 and one or more UMTS base stations 108, 109, 110, 111, which are also called NodeB in line with UMTS.

Within the mobile radio access network, the mobile radio network control units 106, 107 of the individual mobile radio network subsystems 101, 102 are connected to one another by means of what is known as an Iur interface 112. Each mobile radio network control unit 106, 107 respectively monitors the allocation of mobile radio resources in all mobile radio cells in a mobile radio network subsystem 101, 102.

A UMTS base station 108, 109, 110, 111 is respectively connected to a mobile radio network control unit 106, 107 associated with the UMTS base station 108, 109, 110, 111 by means of what is known as an Iub interface 113, 114, 115, 116.

Each UMTS base station 108, 109, 110, 111 provides radio coverage for one or more mobile radio cells (CE) within a mobile radio network subsystem 101, 102. Message signals or data signals are transmitted between a respective UMTS base station 108, 109, 110, 111 and a subscriber station 118 (User Equipment, UE), subsequently also called a mobile radio terminal, in a mobile radio cell using an air interface, called a Uu air interface 117 in line with UMTS, preferably on the basis of a multiple access transmission method.

In line with the UMTS-FDD (Frequency Division Duplex) mode, for example, separate signal transmission in the uplink and downlink (uplink: signal transmission from the mobile terminal 118 to the respective UMTS base station 108, 109, 110, 111; downlink: signal transmission from the respective associated UMTS base station 108, 109, 110, 111 to the mobile radio terminal 118) is achieved through appropriate separate allocation of frequencies or frequency ranges.

A plurality of subscribers, in other words a plurality of activated—or registered in the mobile radio access network—mobile radio terminals 118, in the same mobile radio cell are preferably separated from one another in terms of signalling by means of orthogonal codes, particularly in line with what is known as the CDMA (Code Division Multiple Access) method.

In this connection, it should be noted that FIG. 1 shows just one mobile radio terminal 118 for reasons of simple illustration. In general, however, any number of mobile radio terminals 118 are provided in the mobile radio system 100.

The communication between a mobile radio terminal 118 and another communication station can be set up using a complete mobile radio communication link to another mobile radio terminal, alternatively to a landline communication station.

In one embodiment, OFDMA in combination with TDMA (OFDMA/TDMA) is used for data transmission from and to the mobile radio terminal 118. OFDMA/TDMA is a multi-carrier multiple access method in which a subscriber is provided with a defined number of subcarriers in the frequency spectrum and a defined transmission time for the purpose of data transmission.

Figure 2:
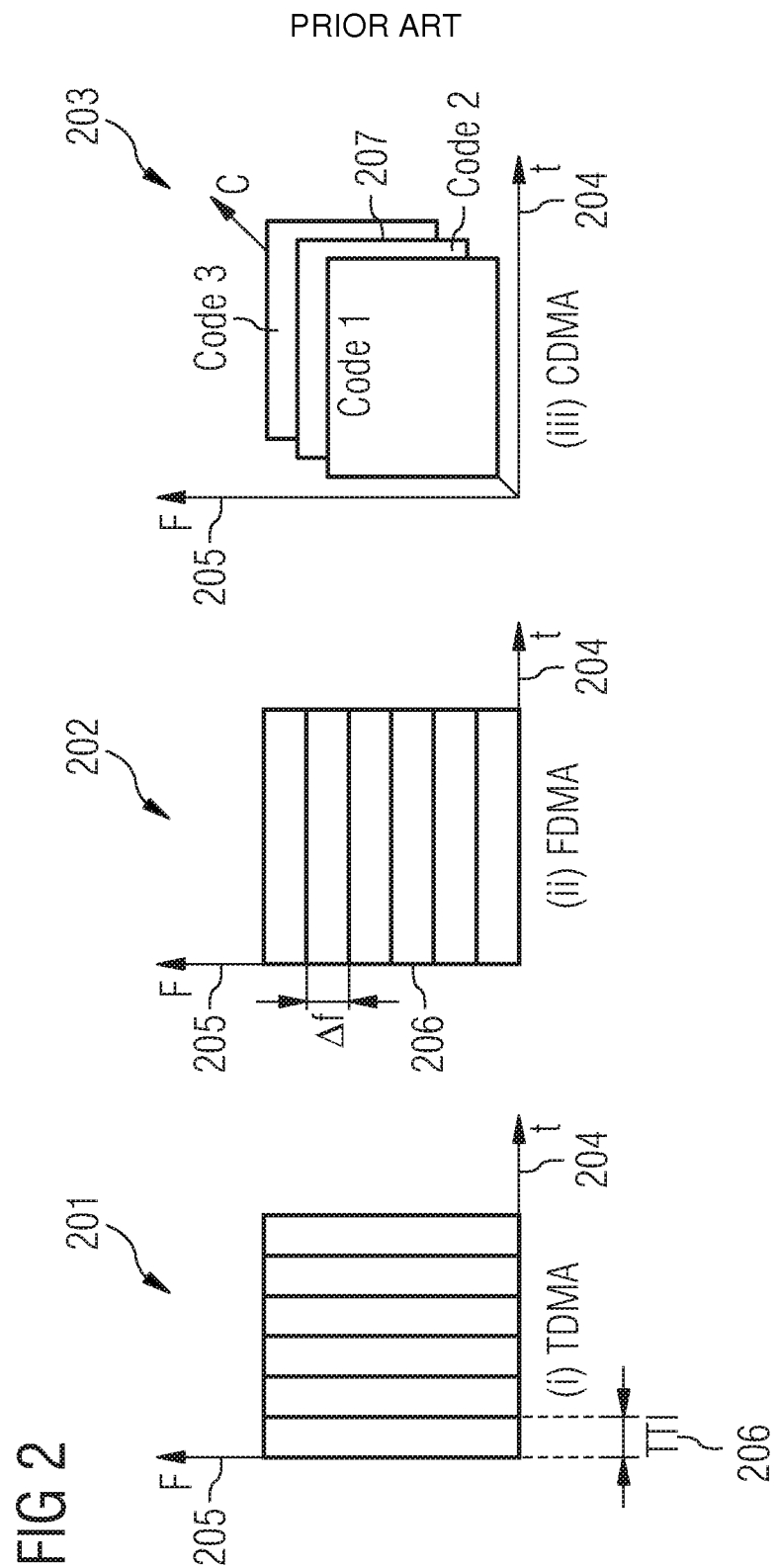
FIG. 2 illustrates basic multiple access methods.

FIG. 2 illustrates basic multiple access methods. In FIG. 2, a first time frequency diagram 201, a second time frequency diagram 202, and third time frequency diagram 203 are shown. In each diagram 201, 202, 203, time increases in the direction of a time axis 204 and frequency increases in the direction of a frequency axis 205.

The first time frequency diagram 201 illustrates TDMA (time division multiple access). In TDMA, each mobile radio terminal may use the whole frequency band provided for the usage by the mobile radio terminals but for each mobile radio device only a predefined transmission time interval (TTI) 206 is allocated in which the mobile radio device may send and receive useful data. During a transmission time interval only one mobile radio device is active in a radio cell.

The second time frequency diagram 202 illustrates FDMA (frequency division multiple access). In FDMA, each mobile radio device may use the whole time period but only a predefined narrow frequency band 206 of the whole frequency band available for sending and receiving useful data. In the narrow frequency band 206 only one mobile radio device is active in the radio cell.

The third time frequency diagram 203 illustrates CDMA (code division multiple access). In CDMA, each mobile radio terminal may send and receive useful data during the whole time period and using the whole frequency band. For avoiding interference between the data sent by different senders, each mobile radio device is allocated a binary code pattern 207. The code patterns 207 which are allocated to the different mobile radio terminals are orthogonal and useful data sent by a mobile radio terminal or to be received by the mobile radio terminal is coded (spreaded) by the code pattern 207 allocated to the mobile radio terminal.

OFDMA (orthogonal frequency division multiple access) is a special case of FDMA and is a multiple carrier method in which the whole frequency band having a bandwidth b is subdivided into m orthogonal sub carriers. Thus, there are m (narrow) frequency bands with a bandwidth of f=b/m. In OFDMA, a data stream to be sent is divided on a multiplicity of sub carriers and is transmitted in parallel wherein the data rate of each sub carrier is accordingly lower than the overall data rate. For each mobile radio terminal, a defined number of sub carriers is allocated for data transmission.

In line with the embodiments which are described in the following, it is assumed that a base station 108, 109, 110, 111 in cellular mobile radio communication networks based on GSM or UMTS uses broadcasts to transmit mobile radio cell information which is relevant to the system and to mobile radio cells to all subscriber stations situated in the mobile radio cell, i.e. the mobile radio terminal 118, for example.

In the case of UMTS, this is done using the Broadcast Control Channel (BCCH) logical channel 301 (cf. block diagram 300 in FIG. 3), which is mapped on to the Broadcast Channel (BCH) transport channel 302 and is physically sent on the Primary Common Control Physical Channel (P-CCPCH) physical channel 303 via the air interface 117. The BCCH 301 and the BCH 302 are respectively used to send 246 information bits which are channel-encoded in the physical layer with a code rate of ⅓, modulated and spread using a spreading code, known throughout the system, with the spreading factor SF=256. Since a fixed transmission period of TTI=20 ms is defined for the BCH, the channel-encoded data are transmitted via the air interface 117 in the mobile radio cell with a distribution over two P-CCPCH frames of length 10 ms.

Figure 3:
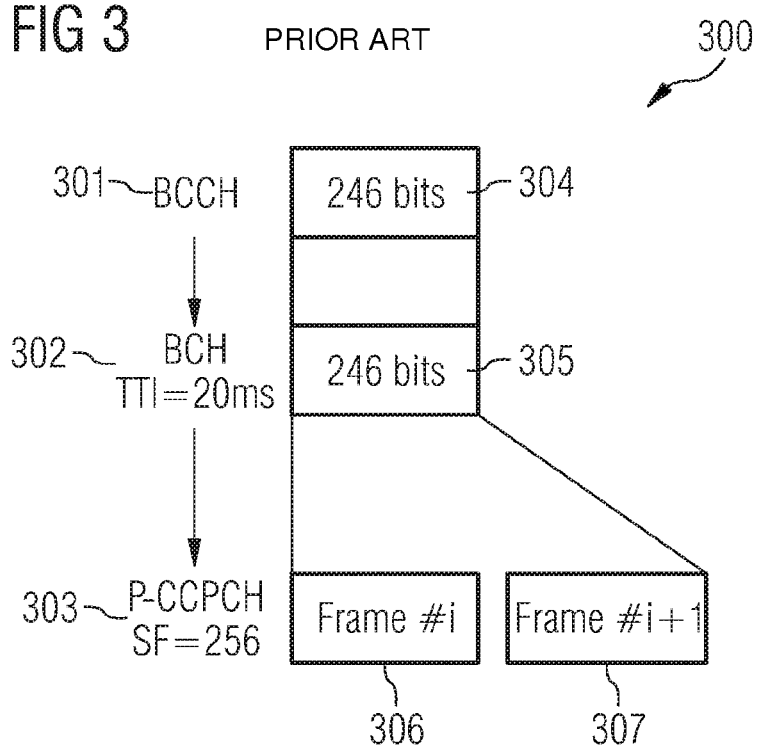
FIG. 3 shows a block diagram illustrating a data flow in a UMTS communication system.

FIG. 3 shows a BCCH frame 304 having 246 bits, which is mapped on to a BCH frame 305, likewise having 246 bits, with a transmission period TTI=20 ms, which BCH frame 305 for its part is mapped onto the physical channel, in line with FIG. 3 onto two P-CCPCH frames, namely a first P-CCPCH frame 306 and a second P-CCPCH frame 307.

The BCH frame 305 includes 246 bits of which 12 bits are used for the system frame number (SFN) and 234 are used for system information (SIB data). The system frame number indicates the timing used in the mobile radio cell and serves for the synchronization of data transmission.

Overall, a large amount of system information is transmitted to all subscriber stations situated in the mobile radio cell.

According to the nature of the information, this information is grouped into various blocks. In this context, a distinction is usually drawn between MIB (Master Information Block) blocks, SB (Scheduling Block) blocks and SIB (System Information Block) blocks. The MIB is used to signal, inter alia, the PLMN (Public Land Mobile Network) identity and also, to a limited degree, scheduling information for the SIBs. An SB block is used to signal the scheduling information for the SIB blocks. In line with UMTS, there are currently 18 SIB types defined.

Examples of such SIB types currently defined in line with UMTS are:

SIB 1:
  contains the information for the UMTS core network (CN) and also the configuration of system-related timers and constants;

SIB 3:
  contains the parameters for mobile radio cell selection and mobile radio cell reselection;

SIB 5:
  contains the configuration of the physical common radio resources for subscriber stations in idle mode;

SIB 6:
  contains the configuration of the physical common radio resources for subscriber stations in connected mode; and SIB 11:
  contains the information for performing measurements.

Using the system information the mobile radio terminal 118 can determine whether it is allowed to camp on the radio cell and may for example determine the radio resources for sending data using the air interface 117.

The amount of system information broadcast may vary from cell to cell. This means that the amount of system information broadcast in a radio cell may depend on the layout of the radio cells of the mobile radio communication system 100 and the amount of system information broadcast in one radio cell may be different from the amount of system information broadcast in another radio cell of the mobile radio communication system 100.

The amount of system information broadcast in a radio cell may for example depend on the following parameters: the frequency bandwidth used for data transmission in the radio cell, the size of the radio cell (for example if it is pico cell, a micro cell or a macro cell), the number of radio cells necessary in a service area of the mobile radio communication system 100, and the maximum traffic load in the radio cell (for example the maximum number of mobile terminals registered in the radio cell or the maximum data transmission capacity in the radio cell).

For example, the amount of system information broadcast in a radio cell is low if the radio cell is designed for being used by relatively few communication terminals and the amount of system information broadcast in a radio cell is high if the radio cell is designed for being used by a relatively high number of communication terminals, i.e. if it is a so called hot-spot. As an example, table 1 shows the amount of system information broadcast in UTMTS FDD radio cells of 4 German mobile network operators. The values shown in table 1 were determined using measurements at a common location.

TABLE 1

| SIB | Size in Bytes | | | |
| --- | --- | --- | --- | --- |
| | Operator 1 | Operator 2 | Operator 3 | Operator 4 |
| MIB | 29 | 29 | 21 | 12 |
| SB1 | not sent | not sent | not sent | 14 |
| SB2 | not sent | not sent | not sent | not sent |
| SIB1 | 29 | 29 | 22 | 17 |
| SIB 2 | 28 | 28 | not sent | 2 |
| SIB 3 | 29 | 29 | 15 | 16 |
| SIB 4 | not sent | not sent | not sent | not sent |
| SIB 5 | 112 | 84 | 88 | 65 |
| SIB 6 | not sent | not sent | not sent | not sent |
| SIB 7 | 29 | 29 | 3 | 3 |
| SIB 11 | 167 | 112 | 156 | 95 |

TABLE 1-continued

| | Size in Bytes | | | |
|---|---|---|---|---|
| SIB | Operator 1 | Operator 2 | Operator 3 | Operator 4 |
| SIB 12-SIB 17 | not sent | not sent | not sent | not sent |
| SIB 18 | not sent | not sent | not sent | 4 |

Due to the limited transmission capacity of the BCH of one transport block of 246 information bits per one transmission time interval of 20 ms a relatively long time is necessary for transmitting the system information (i.e. all system information blocks defined for the radio cell). The time for transmitting the system information and accordingly the time necessary for receiving the system information by a mobile terminal is, depending on the cell configuration and the amount of system information to be transmitted, in the range of 640 ms to several seconds.

System information blocks which include more than 234 bits need to be segmented and transmitted over a defined time interval. In this case, a BCH transport block may include complete system information blocks and additionally segments of other system information blocks. For example, a BCH transport block may include one complete system information block and segments of another system information block or even of more than one other system information block, a single segment of a system information block, etc. This may lead to the fact that the transmission capacity provided by a transport block of 246 information bits is not completely exploited, for example if in an TTI only 150 bits of a system information block in a transport block are to be transmitted, so that the remaining 96 bits need to be padded with zeros which is necessary for the channel encoding.

In one embodiment, the system information is transmitted in accordance with the physical data transmission as it is specified for the LTE downlink. The frame structure of the physical channel is shown in FIG. 4.

Figure 4:
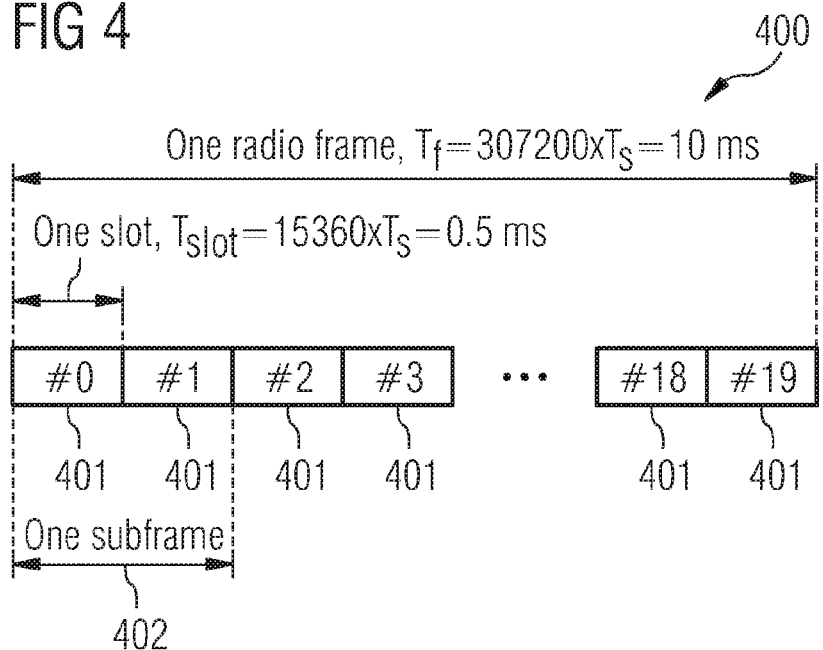
FIG. 4 shows a radio frame structure according to an embodiment of the invention.

FIG. 4 shows a radio frame structure according to an embodiment of the invention.

According to the radio frame structure shown, a radio frame 400 has a length of 10 ms and includes 20 time slots 401 each of length 0.5 ms. Every two times slots 401 may be grouped to one sub frame 402 such that the radio frame 400 includes 10 sub frames of length 1 ms.

The lengths of time slots 401, radio frames 400 and sub frames may be different from those given above in other embodiments.

Figure 5:
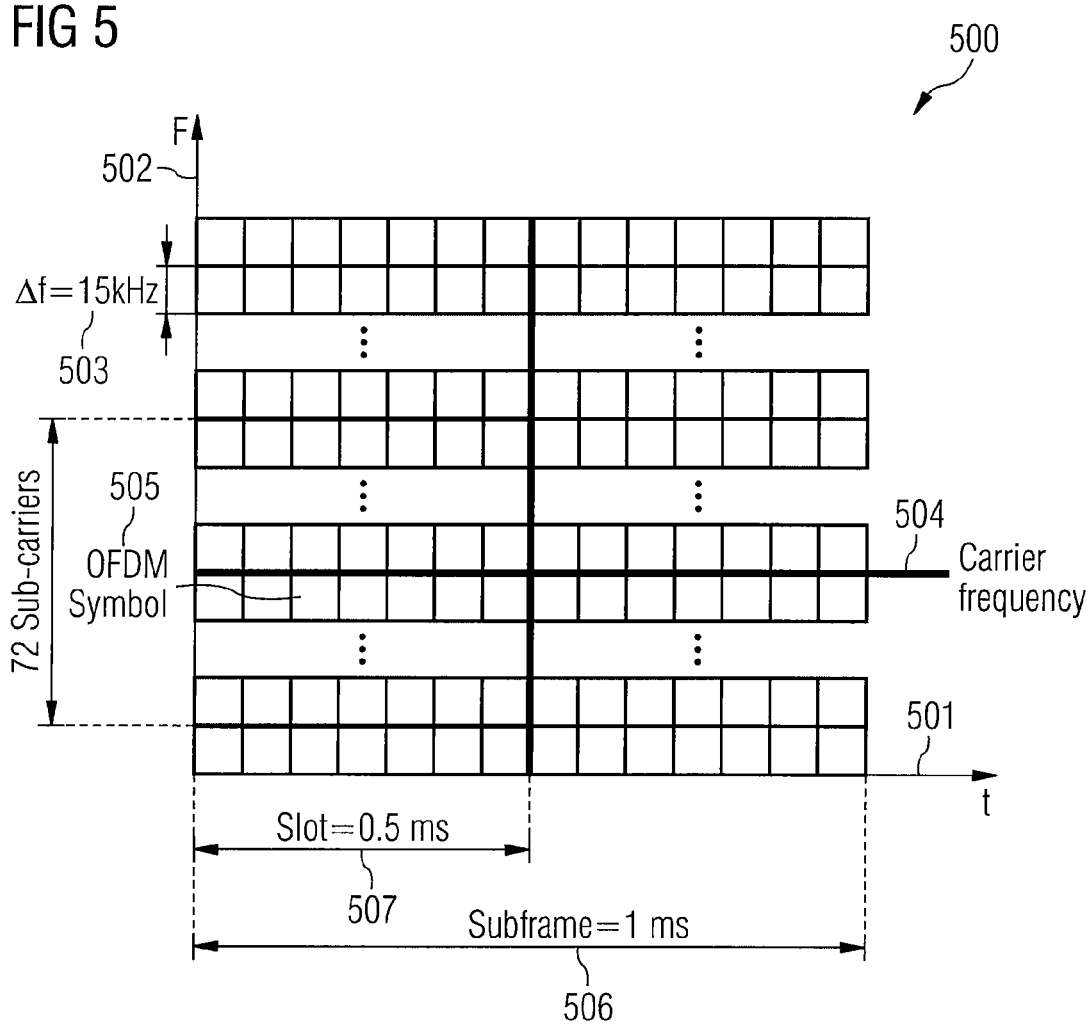
FIG. 5 shows a time frequency diagram according to an embodiment of the invention.

The transmission of OFDM symbols using the time slots 401 is illustrated in FIG. 5.

FIG. 5 shows a time frequency diagram 500 according to an embodiment of the invention.

In FIG. 5, time increases in the direction of a time axis 501 and frequency increases in the direction of a frequency axis 502. In this embodiment, the whole frequency range available for data transmission is divided in a number of sub carriers 503, in this example into 72 sub carriers 503. Each sub carrier is associated with a frequency range of 15 kHz which are arranged around a central carrier frequency 504. For each sub carrier 503, a maximum of 14 OFDM symbols 505 may be transmitted per sub frame 506. This means that per sub carrier 503 and per time slot 507, a maximum of 7 OFDM symbols 505 may be transmitted.

In one embodiment, the data of the BCH transport channel is physically transmitted using the common control physical channel (CCPCH) via the air interface. The transmission capacity of the BCH/CCPCH, the transmission time interval TTI, and the exact position of the OFDM symbols of the BCH/CCPCH in the frame structure are currently not yet specified for the LTE downlink. In one embodiment, the mobile radio communication system 100 fulfils the requirement of future LTE communication systems regarding the scalability for different frequency bandwidths. This means that the channel structure, the transmission parameters and procedures can be applied for different frequency bandwidths. For example, candidate frequency bandwidths used may be 1.25 MHz, 2.5 MHz, 5 MHz, 10 MHz, 15 MHz, and 20 MHz. The primary part of the BCH, i.e. the data sent via the BCH which is independent on the frequency bandwidth used in the respective radio cell, is in one embodiment transmitted using the 72 sub carriers 503 arranged around the central frequency 504.

Figure 6:
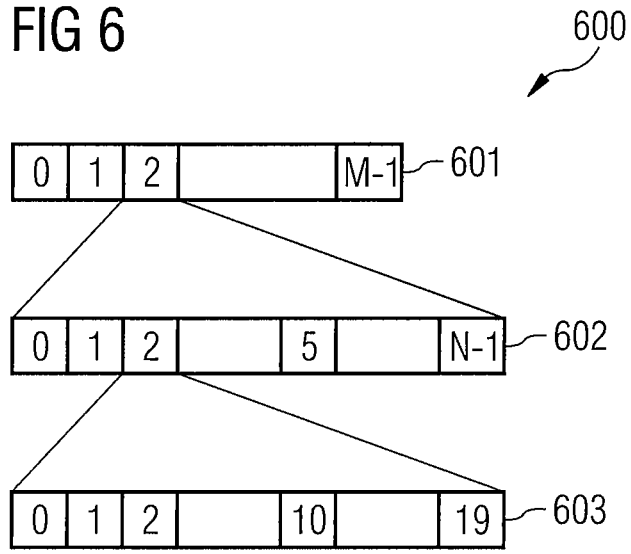
FIG. 6 shows a frame structure according to an embodiment of the invention.

In one embodiment, the system information or a part of the system information such as the primary part of the system information, i.e. the system information sent independently of the frequency bandwidth used in the respective radio cell, is transmitted using the frame structure shown in FIG. 6.

FIG. 6 shows a frame structure 600 according to an embodiment of the invention.

According to the frame structure 600, a sequence of multi frames 601 is defined which includes M multi frames numbered from 0 to m-1. Each multi frame of the sequence of multi frames 601 includes n radio frames 602 (also denoted as system frames) as shown in FIG. 4. In accordance to FIG. 4, each radio frame 602 includes 20 time slots 603.

Each multi frame of the sequence of multi frames 601 is used to transmit system information as will be explained below. The sequence of multi frames 601 is periodically repeated and the corresponding system information is periodically sent on the physical channel. A multi frame number of the current multi frame is transmitted via the BCH such that the frame structure 600 may be derived by the communication terminals receiving the data sent on the BCH. In a multi frame of the sequence of multi frames 601, OFDM radio resources (i.e. pairs of sub carriers and time slots) are reserved for the transmission of system information. For example two time slots 603 of the 20 time slots of each of 3 radio frames 602 of the n radio frames 602 of a multi frame are used for transmitting system information.

As mentioned above, the system information (or the part of system information, for example the primary part of system information) may be grouped into system information blocks.

Further, the system information (or a part of the system information) to be sent is in one embodiment divided into a first part corresponding to parameters for which parameter values are sent in each radio cell independent of the layout of the radio cells and the cell configuration. This means that this first part of a system information has the same size for all radio cells of the mobile radio communication system and is therefore denoted as a part of system information with constant size or for simplicity as constant part (the parameter values may of course vary from cell to cell and from time to time).

The remaining system information corresponds to parameters for which values are not necessarily transmitted in each radio cell. This means that the second part of system information may vary in its size from to cell to cell. It is therefore denoted as part of system information of variable size or (for simplicity) variable part of system information. The division of the system information into the constant part and a variable part allows the efficient usage of the transmission capacity of the BCH primarily for the constant part. Further, it allows the receiving of the constant part independently of the receiving of the variable part by the communication terminals. In other embodiments, the system information are divided into more than two parts.

The distribution of the system information to the OFDM radio resources reserved for the transmission of the system information is carried out according to a predefined scheme depending on the number of parts into which the system information are divided (in this example two parts, the constant part and the variable part) and depending on the capacity of the OFDM radio resources reserved for transmission of system information. For example, the system information are transmitted using the OFDM radio resources reserved in the frame structure 600 for transmission of system information as follows.

The constant part of the system information of the main system information block (also denoted as reference block) which includes the most important reference data of the respective radio cell is transmitted in the first time slot of the first system frame of each multi frame. Alternatively, if this time slot is not reserved for transmission of system information, the constant part of the main system information block is transmitted using the time slot with the lowest number in the system frame with the lowest number reserved for transmission of system information in each multi frame. The variable part of the main system information block is transmitted in the time slots with higher numbers reserved for transmission of system information (for example second time slot, third time slot, . . . ) of the first radio frame (or the radio frame with the lowest number reserved for transmission of system information) in each multi frame. The constant part of the system information of the main system information block includes for example the multi frame number of the respective multi frame which is to be transmitted in each multi frame.

The constant parts of the other system information blocks, i.e. the system information blocks other than the main system information block, are sent using the time slot reserved for transmission of system information of the system frame with the second-lowest number in which time slots are reserved for the transmission of system information (for example the second radio frame, third radio frame etc.) of the first multi frame (multi frame No.0). The variable parts of the other system information blocks are sent using the time slots reserved for transmission of system information of the second multi frame and the following multi frames which are not used for transmission of system information of the main system information block.

Figure 7:
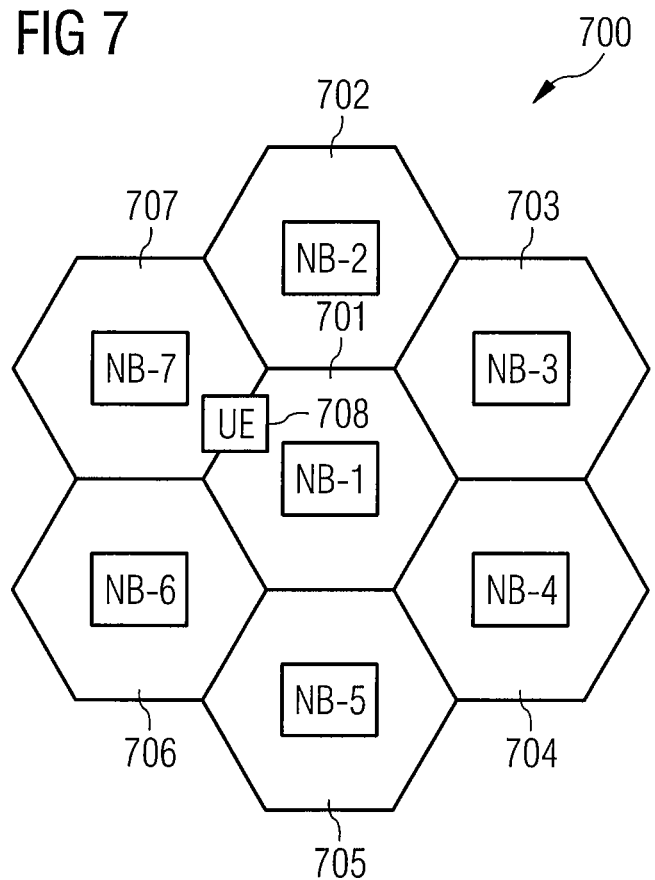
FIG. 7 shows a radio cell arrangement according to an embodiment of the invention.

For example, the distribution of the system information may be as follows:
 multi-frame No.0: system information of the main system information block plus constant part of the system information of other system information blocks
 multi-frame No.1: system information of main system information block plus variable part of other system information blocks
 multi-frame No.2: system information of main system information block plus variable part of other system information blocks et cetera An example of the transmission of system information for a radio cell arrangement as it is shown in FIG. 7 is explained in the following.

FIG. 7 shows a radio cell arrangement 700 according to an embodiment of the invention.

The radio cell arrangement 700 includes a first radio cell 701, a second radio cell 702, a third radio cell 703, a fourth radio cell 704, a fifth radio cell 705, a sixth radio cell 706, and a seventh radio cell 707.

A mobile terminal 708 is located at the boundary of the seventh radio cell 707 and the first radio cell 701.

The mobile terminal 708 may receive system information broadcast by the base station of the seventh radio cell 707 and system information broadcast by the base station of the first radio cell 701.

In this example, it is assumed that for the primary part of the system information radio resources of 72 sub carriers in a frequency range arranged around a central frequency can be allocated as it is shown in FIG. 5. In this example, it is assumed that a maximum of one OFDM symbol in a time slot may be reserved for the transmission of the primary part of the system information. For example, QPSK (quadrature phase shift keying) modulation is used and a code rate of ⅓ is used for transmission of system information bits of the primary system information bits. Consequently, in one time slot a maximum of 48 system information bits may be transmitted. In other embodiments, other modulation methods and reserved number of OFDM symbols in a time slot may be used.

It is further assumed that the multi frame structure as it is shown in FIG. 6 is used wherein m=2 and n=8. This is shown in FIG. 8.

Figure 8:
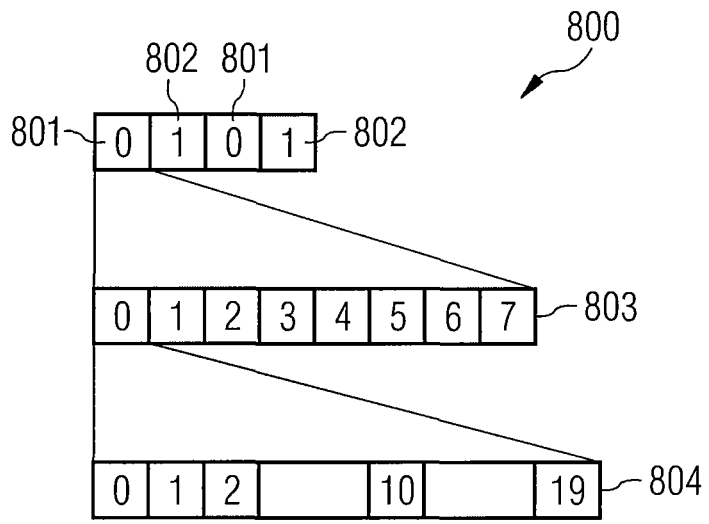
FIG. 8 shows a frame structure according to an embodiment of the invention.

FIG. 8 shows a frame structure 800 according to an embodiment of the invention.

The frame structure 800 includes a first multi frame 801 (multi frame No.0) and a second multi frame 802 (multi frame No.1). The sequence of multi frames made by the first multi frame 801 and the second multi frame 802 is periodically repeated. In FIG. 8, it is shown two times. Each multi frame 801, 802 includes n=8 radio frames (system frames) 803 and each radio frame 803 includes 20 time slots 804.

It is assumed that for transmission of the system information in the radio frames 803 numbered 0, 2 and 5 the time slots numbered 0 and 10 are reserved for the transmission of system information. In this example the following two groups of time slots are defined:
 First time slot group: time slots numbered 0 and 10 of the radio frames numbered 0, 2 and 5 in first multi frame 801; time slots numbered 0 and 10 of the radio frame numbered 0 in second multi frame 802;
 Second time slot group: time slots numbered 0 and 10 of the radio frames numbered 2 and 5 in second multi frame 802.

In this example, the primary part of system information which is to be transmitted using the 72 sub carriers includes three system information blocks which are each divided according to the division of the system information into a constant part and a variable part:
 Ref-SIB (main system information block): This system information block has a size between 36 bits and 64 bits. The system information of the Ref-SIB belonging to the constant part of system information is 36 bits and the system information belonging to the variable part of the Ref-SIB has a size of 28 bits.
 SIB 1: The system information block has a size between 120 bits and 216 bits. The system information of SIB 1 belonging to the constant part of the system information has a size of 120 bits and the system information of SIB 1 belonging to the variable part of system information has a size of 96 bits.
 SIB 2: The system information block has a size between 48 bits and 128 bits. The system information of SIB 2 belonging to the constant part of system information has a size of 48 bits and the system information belonging to the variable part of system information has a size of 80 bits.

In this example, data belonging to the constant part are associated with a first priority and data belonging to the variable part are associated with second priority.

Initially, it is assumed that in all radio cells 701 to 707 the system information block Ref-SIB, SIB 1 and SIB 2 are completely broadcast. For example, the radio cells 701 to 707 are hot spot radio cells which are designed for a high number of users. The distribution of the system information to the radio resources reserved is the same in all seven radio cells 701 to 707 and is for example as follows:

multi frame No.0:
- system frame No.0: Time slot No.0 is used for transmission of the 36 bits belonging to the constant part of the Ref-SIB and time slot No.10 is used for transmission of the 28 bits of Ref-SIB belonging to the variable part.
- system frame No.2: Time slot No.0 and time slot No.10 are each used for transmission of 40 bits of SIB 1 belonging to the constant part.
- system frame No.5: Time slot No.0 is used for transmission of 40 bits of SIB 1 belonging to the constant part and time slot No.10 is used for transmission of the 48 bits of SIB 2 belonging to the constant part.

multi frame No.1:
- system frame No.0: Time slot No.0 is used for transmission of the 36 bits of Ref-SIB belonging to the constant part and time slot No.10 is used for transmission of the 28 bits of the Ref-SIB belonging to the variable part.
- system frame No.2. Time slot No.0 and time slot No.10 are each used for transmission of 48 bits of the variable part of SIB 1.
- system frame No.5: Time slot No.0 and time slot No.10 are each used for transmission of 40 bits of the SIB 2 of the variable part.

In this case, the mobile terminal needs to decode the system information transmitted in each multi frame 801, 802 of the seventh radio cell 707 and the first radio cell 701.

Now it is assumed that in the sixth radio cell 706 and in the seventh radio cell 707 only system information belonging to the constant part of the system information blocks Ref-SIB, SIB 1 and SIB 2 is transmitted. For example, the sixth radio cell 706 and the seventh radio cell 707 are radio cells designed for only a low number of users. In this example the following two groups of time slots are defined:

First time slot group: time slot numbered 0 of the radio frame numbered 0 in first and second multi frame 801, 802; time slots numbered 0 and 10 of the radio frames numbered 2 and 5 in first multi frame 801;

Second time slot group: Empty.

The distribution of system information to the radio resources reserved for transmission of system information in the sixth radio cell 706 and the seventh radio cell 707 for this example is as follows:

multi frame No.0:
- system frame No.0: Only time slot No.0 is used for transmission of 36 bits of Ref-SIB belonging to the constant part and time slot No.10 is not used for transmission of system information.
- system frame No.2: Time slot No.0 and time slot No.10 are each used for transmission of 40 bits of SIB 1 belonging to the constant part.
- system frame No.5: Time slot No.0 is used for transmission of 40 bits of SIB 1 belonging to the constant part and time slot No.10 is used for transmission of 48 bits of SIB 2 belonging to the constant part.

multi frame No.1:
- system frame No.0: Only time slot No.0 is used for transmission of 36 bits of Ref-SIB belonging to the constant part and time slot No.10 is not used for transmission of system information.
- System frame No.2 and system frame No.5 are not used for transmission of system information. This means that the system resource reserved in system frame No.2 and No.5 for transmission of system information may be used for data transmission of other transport channels.

In this case the mobile terminal 708 needs only to decode the data sent using the first multi frame 801 of the seventh radio cell 707.

An embodiment of the invention is described in the following with reference to FIG. 9.

Figure 9:
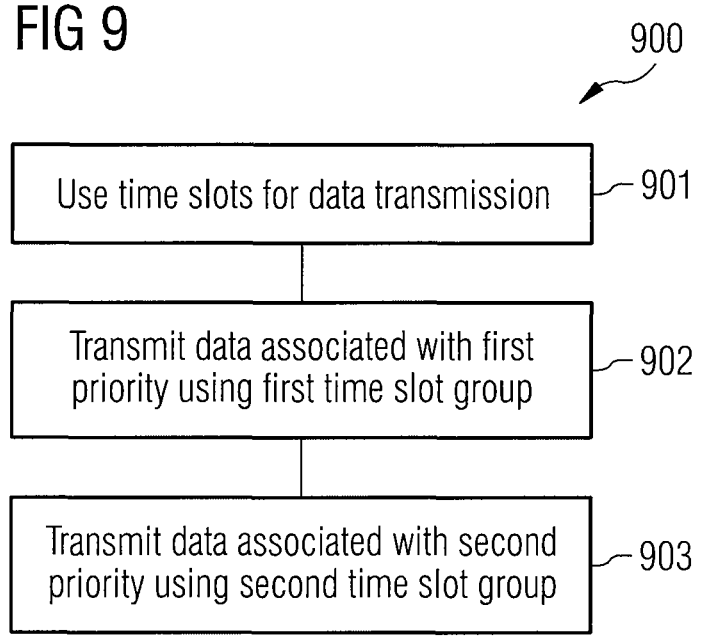
FIG. 9 shows a diagram according to an embodiment of the invention.

FIG. 9 shows a diagram 900 according to an embodiment of the invention.

The diagram 900 illustrates a method for transmitting data according to an embodiment of the invention.

In 901, a plurality of time slots of a physical channel is used for transmission of the data, the plurality of time slots being grouped into at least a first time slot group and a second time slot group.

In 902, data items of the data being associated with a first priority are transmitted using time slots of the first time slot group.

In 903, data items of the data being associated with a second priority are transmitted using radio frames of the second time slot group.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims and therefore intended to be embraced.

What is claimed is:

1. A method for transmitting data comprising:
using a plurality of multi-frames, each multi-frame comprising a plurality of time slots of a physical channel for transmission of the data, the plurality of time slots being grouped into at least a first time slot group and a second time slot group, wherein in each timeslot a frequency range available for data transmission is divided into the same number of sub carriers arranged around a central frequency and used for transmission of the data;
transmitting data items of the data being associated with a first priority using time slots of the first time slot group; and
transmitting data items of the data being associated with a second priority using time slots of the second time slot group,
wherein the time slots are arranged in such a way that the data items associated with the first priority are all transmitted before transmitting a first data item associated with the second priority,
wherein the data is system information broadcast in the radio cell,
wherein the data items associated with the first priority correspond to parameters for which parameter values are transmitted in each radio cell of a plurality of radio cells of a cellular communication network,
wherein the data items associated with the second priority correspond to parameters for which parameter values are not necessarily transmitted in each radio cell of a plurality of radio cells of a cellular communication network, and wherein the plurality of time slots is a plurality of time slots reserved for the transmission of the data.

2. The method according to claim 1, wherein the data items are sent in a radio cell of a cellular communication network.

3. The method according to claim 1, wherein the data is transmitted using OFDM resources, and the method further comprises reserving in the first time slot group and the second time slot group OFDM resources for the transmission of the data.

4. A transmitter configured to use a plurality of multi-frames, each multi-frame comprising a plurality of time slots of a physical channel for transmission of data, the plurality of time slots being grouped into at least a first time slot group and a second time slot group, wherein in each timeslot a frequency range available for data transmission is divided into the same number of sub carriers arranged around a central frequency and used for transmission of the data, configured to transmit data items of the data being associated with a first priority using time slots of a first time slot group, and configured to transmit data items of the data being associated with a second priority using time slots of a second time slot group, wherein the time slots are arranged in such a way that the data items associated with the first priority are all transmitted before transmitting a first data item associated with the second priority, wherein the data is system information broadcast in the radio cell, wherein the data items associated with the first priority correspond to parameters for which parameter values are transmitted in each radio cell of a plurality of radio cells of a cellular communication network, wherein the data items associated with the second priority correspond to parameters for which parameter values are not necessarily transmitted in each radio cell of a plurality of radio cells of a cellular communication network, and wherein the plurality of time slots is a plurality of time slots reserved for the transmission of the data.

5. The transmitter according to claim 4, wherein the data items are sent in a radio cell of a cellular communication network.

6. The transmitter according to claim 4, wherein the data are transmitted using OFDM resources, and the method further comprises reserving in the first time slot group and the second time slot group OFDM resources for the transmission of the data.

7. The transmitter according to claim 4, being part of a base station of a cellular communication network.

8. A receiver comprising:

a determining circuit configured to determine which time slot group of at least two time slot groups into which a plurality of time slots are grouped is used for transmitting data items of the data associated with a priority, wherein the time slots are part of a plurality of multi-frames and in each timeslot a frequency range available for data transmission is divided into the same number of sub carriers arranged around a central frequency and used for transmission of the data; and a receiving circuit configured to receive the data items associated with the priority during the time slots of the time slot group determined, wherein the determining circuit is further configured to determine which other time slot group of the at least two time slot groups into which the plurality of time slots are grouped is used for transmitting data items of the data associated with another priority, and the receiving circuit is further configured to receive the data items associated with the other priority during the time slots of the other time slot group, wherein the data is system information broadcast in the radio cell, wherein the data items associated with the first priority correspond to parameters for which parameter values are transmitted in each radio cell of a plurality of radio cells of a cellular communication network, wherein the data items associated with the second priority correspond to parameters for which parameter values are not necessarily transmitted in each radio cell of a plurality of radio cells of a cellular communication network, wherein the plurality of time slots is a plurality of time slots reserved for the transmission of the data, and wherein the data is transmitted using OFDM resources.

* * * * *